(12) United States Patent
Hou

(10) Patent No.: US 7,639,467 B2
(45) Date of Patent: Dec. 29, 2009

(54) OVER-VOLTAGE PROTECTION CIRCUIT

(75) Inventor: Chuan-Tsai Hou, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 212 days.

(21) Appl. No.: 11/949,054

(22) Filed: Dec. 3, 2007

(65) Prior Publication Data
US 2009/0059456 A1     Mar. 5, 2009

(30) Foreign Application Priority Data
Aug. 28, 2007    (CN) .................... 2007 1 0201489

(51) Int. Cl.
*H02H 9/04* (2006.01)
(52) U.S. Cl. .................................. 361/91.5; 361/91.1
(58) Field of Classification Search .................. 361/86, 361/88, 91.1, 91.5, 91.6; 340/662
See application file for complete search history.

(56) References Cited

U.S. PATENT DOCUMENTS

| 5,532,894 A * | 7/1996 | Sweaton ............... 361/18 |
| 6,556,410 B1 * | 4/2003 | Manning et al. ....... 361/118 |
| 6,856,242 B2 * | 2/2005 | Trent ................. 340/384.1 |

* cited by examiner

*Primary Examiner*—Danny Nguyen
(74) *Attorney, Agent, or Firm*—Frank R. Niranjan

(57) ABSTRACT

An over-voltage protection circuit assembly includes a connector and an over-voltage protection circuit. The connector includes a power terminal. The over-voltage protection circuit includes a voltage input terminal, and a voltage output terminal. The voltage output terminal connected to the voltage input terminal via a resistor. A relay includes an inductance coil and a switch. The inductance coil is connected between the voltage input terminal and ground. A warning unit is connected in series with the switch of the relay between the voltage input terminal and ground. A voltage regulating diode is connected between the voltage output terminal and ground. The anode of the voltage regulating diode is connected to ground, and the cathode of the voltage regulating diode is connected to the voltage output terminal.

4 Claims, 1 Drawing Sheet

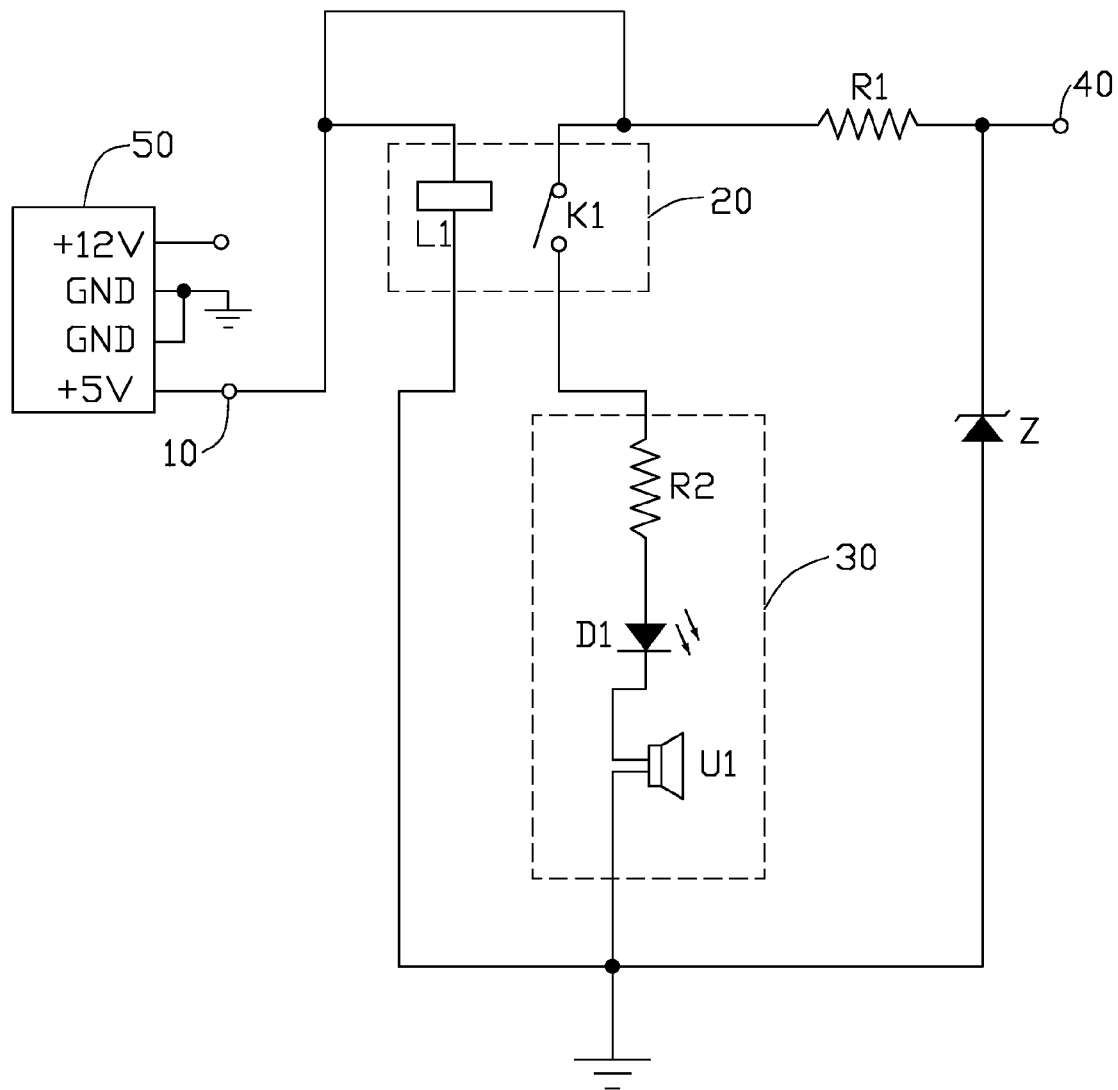

OVER-VOLTAGE PROTECTION CIRCUIT

BACKGROUND

1. Field of the Invention

The present invention relates to an over-voltage protection circuit.

2. Description of Related Art

Generally speaking, connectors are used for joining electronic circuits together and transmitting power or data therebetween. Quality of the connectors may affect not only reliability of signal transmission among electronic circuits, but also the overall operation of electronic equipment. Usually, a four pin connector has 12V and 5V voltage terminals. Users may mis-plug the connector and provide an over-voltage to the electronic circuits. If 12V is provided to a 5V circuit, the circuit may be damaged or destroyed.

What is desired, therefore, is to provide an over-voltage protection circuit.

SUMMARY

In one embodiment, an over-voltage protection circuit assembly includes a connector and an over-voltage protection circuit. The connector includes a power terminal configured to receive power. The over-voltage protection circuit includes a voltage input terminal configured to connect with the power terminal of the connector, a voltage output terminal configured to connect with the electronic circuit. The voltage output terminal is connected to the voltage input terminal via a resistor. There is a relay, which includes an inductance coil and a switch, the inductance coil connected between the voltage input terminal and ground. A warning unit is connected in series with the switch of the relay between the voltage input terminal and ground, and a voltage regulating diode is connected between the voltage output terminal and ground, the anode of the voltage regulating diode is connected to ground, and the cathode of the voltage regulating diode connected to the voltage output terminal. If the voltage input terminal receives a voltage suitable for the electronic circuit, the relay is open, the warning unit does not work, and the voltage output terminal outputs the voltage to the electronic circuit, and if the voltage input terminal receives a voltage greater than the suitable voltage of the electronic circuit, the relay is closed, the warning unit alarms, and the greater voltage is regulated to the suitable voltage by the voltage regulating diode.

Other advantages and novel features of the present invention will become more apparent from the following detailed description of preferred embodiment when taken in conjunction with the accompanying drawing, in which:

BRIEF DESCRIPTION OF THE DRAWINGS

The drawing is a circuit diagram of an over-voltage protection circuit assembly in accordance with an embodiment of the present invention.

DETAILED DESCRIPTION

Referring to the drawing, an over-voltage protection circuit assembly includes a connector 50 and an over-voltage protection circuit comprising a voltage input terminal 10, a relay 20, a warning unit 30, a voltage regulating diode Z, a first resistor R1, and a voltage output terminal 40. The relay 20 includes an inductance coil L1 and a switch K1. The warning unit 30 includes a second resistor R2, a light-emitting diode (LED) D1, and a buzzer U1.

The voltage input terminal 10 is connected to the voltage output terminal 40 via the first resistor R1. One end of the inductance coil L1 is connected to the voltage input terminal 10, and the other end of the inductance coil L1 is grounded. The switch K1 of the relay 20, the second resistor R2, the LED D1, and the buzzer U1 are connected in series between the voltage input terminal 10 and ground, with the cathode of the LED D1 grounded via the buzzer U1 and the anode of the LED D1 connected to the second resistor R2. The cathode of the voltage regulating diode Z is connected to the voltage output terminal 40. The anode of the regulating diode Z is grounded.

The following uses a four-pin connector as the connector 50 as an example. The four-pin connector 50 includes a +12V power terminal, a +5V power terminal, and two ground terminals. The voltage input terminal 10 of the over-voltage protection circuit is connected to the +5V power terminal of the connector 50. If the connector 50 is connected normally, i.e., the +5V power terminal receives a +5V voltage, and the +12V power terminal receives a +12V voltage, the relay 20 is open, the warning unit 30 does not work, and the voltage output terminal 40 outputs the +5V voltage to an electronic circuit. In this embodiment, the threshold voltage of the relay 20 is set to be greater than 5V but less than 12V.

If the connector 50 is connected abnormally, i.e., the voltage input terminal 10 receives a 12V voltage, the relay 20 receives the +12V voltage which is greater than its threshold voltage, and is closed. The LED D1 of the warning unit 30 lights up and the buzzer U1 activates. At the same time, the 12V voltage is regulated to 5V by the voltage regulating diode Z, thereby the electronic circuit connected to the voltage output terminal 40 is protected from being damaged or destroyed.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An over-voltage protection circuit assembly for protecting an electronic circuit from being damaged by over-voltage, the over-voltage protection circuit assembly comprising:
   a connector comprising a power terminal configured to receive power; and
   an over-voltage protection circuit comprising:
   a voltage input terminal configured to connect with the power terminal of the connector;
   a voltage output terminal configured to connect with the electronic circuit, the voltage output terminal connected to the voltage input terminal via a resistor;
   a relay comprising an inductance coil and a switch, the inductance coil connected between the voltage input terminal and ground;
   a warning unit connected in series with the switch of the relay between the voltage input terminal and ground; and
   a voltage regulating diode connected between the voltage output terminal and ground, the anode of the voltage regulating diode connected to ground, and the cathode of the voltage regulating diode connected to the voltage output terminal;
   wherein if the voltage input terminal receives a voltage suitable for the electronic circuit, the relay is open, the warning unit does not work, and the voltage output terminal outputs the voltage to the electronic circuit; and if the voltage input terminal receives a voltage greater than the suitable voltage of the electronic circuit, the relay is closed, the warning unit alarms, and the greater voltage is regulated to the suitable voltage by the voltage regulating diode.

2. The over-voltage protection circuit assembly as claimed in claim 1, wherein the warning unit comprises a buzzer connected between the switch and ground.

3. The over-voltage protection circuit assembly as claimed in claim 2, wherein the warning unit further comprises an LED, the LED is connected between the switch and the buzzer, with the anode of the LED connected to the switch via a resistor, and the cathode of the LED connected to the buzzer.

4. The over-voltage protection circuit assembly as claimed in claim 1, wherein the connector is a four pin connector which comprises a 12V power terminal and a 5V power terminal, the voltage input terminal is connected to the 5V power terminal.

* * * * *